United States Patent
Sheikholeslami et al.

(10) Patent No.: US 12,205,349 B2
(45) Date of Patent: Jan. 21, 2025

(54) SYSTEM AND METHOD FOR IMPROVING ROBUSTNESS OF PRETRAINED SYSTEMS IN DEEP NEURAL NETWORKS UTILIZING RANDOMIZATION AND SAMPLE REJECTION

(71) Applicants: Robert Bosch GmbH, Stuttgart (DE); Carnegie Mellon University, Pittsburgh, PA (US)

(72) Inventors: Fatemeh Sheikholeslami, Pittsburgh, PA (US); Wan-Yi Lin, Wexford, PA (US); Jan Hendrik Metzen, Boeblingen (DE); Huan Zhang, Pittsburgh, PA (US); Jeremy Kolter, Pittsburgh, PA (US)

(73) Assignees: Robert Bosch GmbH (DE); Carnegie Mellon University, Pittsburgh, PA (US)

( * ) Notice: Subject to any disclaimer, the term of this patent is extended or adjusted under 35 U.S.C. 154(b) by 412 days.

(21) Appl. No.: 17/698,556

(22) Filed: Mar. 18, 2022

(65) Prior Publication Data
US 2023/0298315 A1 Sep. 21, 2023

(51) Int. Cl.
G06V 10/764 (2022.01)
G06T 5/70 (2024.01)
G06V 10/84 (2022.01)

(52) U.S. Cl.
CPC .............. G06V 10/764 (2022.01); G06T 5/70 (2024.01); G06V 10/84 (2022.01);
(Continued)

(58) Field of Classification Search
CPC .......... G06V 10/764; G06V 10/84; G06T 5/70
See application file for complete search history.

(56) References Cited

U.S. PATENT DOCUMENTS 9,171,265 B1 * 10/2015 Lathia ...................... G06N 7/01
2016/0093048 A1 * 3/2016 Cheng .................... G06V 10/82
382/131
(Continued)

OTHER PUBLICATIONS

Madry et al., "Towards Deep Learning Models Resistant to Adversarial Attacks", arXiv:1706.06083v1 [stat.ML] Jun. 19, 2017, 22 Pages.
(Continued)

*Primary Examiner* — Kevin Ky
(74) *Attorney, Agent, or Firm* — Dickinson Wright PLLC

(57) ABSTRACT

A system includes a machine-learning network. The network includes an input interface configured to receive input data from a sensor. The processor is programmed to receive the input data, generate a perturbed input data set utilize the input data, wherein the perturbed input data set includes perturbations of the input data, denoise the perturbed input data set utilizing a denoiser, wherein the denoiser is configured to generate a denoised data set, send the denoised data set to both a pre-trained classifier and a rejector, wherein the pre-trained classifier is configured to classify the denoised data set and the rejector is configured to reject a classification of the denoised data set, train, utilizing the denoised input data set, the a rejector to achieve a trained rejector, and in response to obtaining the trained rejector, output an abstain classification associated with the input data, wherein the abstain classification is ignored for classification.

19 Claims, 9 Drawing Sheets

(52) U.S. Cl.
CPC ............... *G06T 2207/20076* (2013.01); *G06T 2207/20081* (2013.01); *G06T 2207/20084* (2013.01)

(56) References Cited

U.S. PATENT DOCUMENTS

| | | | | |
|---|---|---|---|---|
| 2016/0202074 | A1* | 7/2016 | Woodard | G06Q 10/047 701/465 |
| 2018/0122048 | A1* | 5/2018 | Wang | G06N 3/08 |
| 2018/0165554 | A1* | 6/2018 | Zhang | G06N 3/045 |
| 2019/0005360 | A1* | 1/2019 | Heide | G06F 18/24133 |
| 2019/0156524 | A1* | 5/2019 | Park | G06T 5/60 |
| 2020/0116879 | A1* | 4/2020 | Pavlovski | G01T 3/065 |
| 2020/0241096 | A1* | 7/2020 | Bustin | G01R 33/4818 |
| 2020/0394506 | A1* | 12/2020 | Louizos | G06N 3/08 |
| 2021/0089842 | A1* | 3/2021 | Rosenfeld | G06N 3/088 |
| 2022/0027709 | A1* | 1/2022 | Honkala | G06N 3/08 |
| 2022/0036741 | A1* | 2/2022 | Ozturk | G06N 3/08 |
| 2022/0051093 | A1* | 2/2022 | Skaljak | G06T 15/06 |
| 2022/0130084 | A1* | 4/2022 | Litwiller | G06T 5/60 |
| 2022/0138949 | A1* | 5/2022 | Enzmann | G06T 7/0016 382/128 |
| 2022/0180723 | A1* | 6/2022 | Cheng | G01S 13/62 |
| 2022/0219691 | A1* | 7/2022 | Maleki | G06F 11/079 |
| 2022/0318376 | A1* | 10/2022 | Cho | G06V 10/82 |
| 2022/0351496 | A1* | 11/2022 | Dou | G06V 10/762 |
| 2022/0383502 | A1* | 12/2022 | Teder | G16H 30/40 |
| 2023/0162341 | A1* | 5/2023 | Yu | G06V 10/776 |
| 2023/0214288 | A1* | 7/2023 | Moctezuma | H04L 67/02 714/48 |
| 2023/0298315 | A1* | 9/2023 | Sheikholeslami | G06F 18/214 707/737 |

OTHER PUBLICATIONS

Raghunathan et al., "Certified Defenses Against Adversarial Examples", Published as a conference paper at ICLR 2018, 15 Pages.
Gowal et al., "On the Effectiveness of Interval Bound Propagation for Training Verifiably Robust Models", arXiv:1810.12715v1 [cs.LG] Oct. 30, 2018, 12 Pages.
Wong et al., "Scaling provable adversarial defenses", 32nd Conference on Neural Information Processing Systems (NeurIPS 2018), Montreal, Canada, 10 Pages.
Zhang et al., "Towards Stable and Efficient Training of Verifiably Robust Neural Networks", arXiv:1906.06316v2 [cs.LG] Nov. 27, 2019, 25 Pages.
Cohen et al., "Certified Adversarial Robustness via Randomized Smoothing", Proceedings of the 36 th International Conference on Machine Learning, Long Beach, California, PMLR 97, 2019, 11 Pages.
Laidlaw et al., "Playing it Safe: Adversarial Robustness with an Abstain Option", arXiv:1911.11253v1 [cs.LG] Nov. 25, 2019, 14 Pages.
Tramèr et al., "On Adaptive Attacks to Adversarial Example Defenses", arXiv:2002.08347v2 [cs.LG] Oct. 23, 2020, 44 Pages.
Salman et al., "Denoised Smoothing: A Provable Defense for Pretrained Classifiers", 34th Conference on Neural Information Processing Systems (NeurIPS 2020), Vancouver, Canada, 13 Pages.
Sheikholeslami et al., "Provably Robust Classification of Adversarial Examples With Detection", Published as a conference paper at ICLR 2021, 16 Pages.

Athalya et al., "Obfuscated Gradients Give a False Sense of Security: Circumventing Defenses to Adversarial Examples", Proceedings of the 35 th International Conference on Machine Learning, Stockholm, Sweden, PMLR 80, 2018, 10 Pages.
Biggio et al., "Evasion Attacks against Machine Learning at Test Time", ECML PKDD 2013, Part III, LNAI 8190, 2013, pp. 387-402.
Carlini et al., "Towards Evaluating the Robustness of Neural Networks", 2017 IEEE Symposium on Security and Privacy, pp. 39-57.
Fischer et al., "Scalable Certified Segmentation via Randomized Smoothing", Proceedings of the 38 th International Conference on Machine Learning, PMLR 139, 2021, 12 Pages.
Geifman et al., "SelectiveNet: A Deep Neural Network with an Integrated Reject Option", Proceedings of the 36 th International Conference on Machine Learning, Long Beach, California, PMLR 97, 2019, 9 Pages.
Goodfellow et al., "Explaining and Harnessing Adversarial Examples", arXiv:1412.6572v1 [stat.ML] Dec. 20, 2014, 10 Pages.
Kumar et al., "Curse of Dimensionality on Randomized Smoothing for Certifiable Robustness", Proceedings of the 37 th International Conference on Machine Learning, Online, PMLR 119, 2020, 13 Pages.
Atlidakis et al., "Certified Robustness to Adversarial Examples with Differential Privacy", 2019 IEEE Symposium of Security and Privacy, pp. 656-673.
Levine et al., "Wasserstein Smoothing: Certified Robustness against Wasserstein Adversarial Attacks", Proceedings of the 23rd International Conference on Artificial Intelligence and Statistics (AISTATS) 2020, Palermo, Italy. PMLR: vol. 108, 9 Pages.
Li et al., "Second-Order Adversarial Attack and Certifiable Robustness", arXiv: 1809.03113v1 [cs.LG] Sep. 10, 2018, 15 Pages.
Ziyin et al., "Deep Gamblers: Learning to Abstain with Portfolio Theory", 33rd Conference on Neural Information Processing Systems (NeurIPS 2019), Vancouver, Canada, 17 Pages.
Stutz et al., "Confidence-Calibrated Adversarial Training: Generalizing to Unseen Attacks", Proceedings of the 37 th International Conference on Machine Learning, Vienna, Austria, PMLR 119, 2020, 43 Pages.
Szegedy et al., "Intriguing properties of neural networks", arXiv:1312.6199v1 [cs.CV] Dec. 21, 2013, 9 Pages.
Tai et al., "MemNet: A Persistent Memory Network for Image Restoration", Proceedings of the IEEE international conference on computer vision 2017, pp. 4539-4547.
Tramèr., "Detecting Adversarial Examples Is (Nearly) as Hard as Classifying Them", arXiv:2107.11630v1 [cs.LG] Jul. 24, 2021, 6 Pages.
Tramèr et al., "Ensemble Adversarial Training: Attacks and Defenses", arXiv:1705.07204v1 [stat.ML] May 19, 2017, 14 Pages.
Uesato et al., "Adversarial Risk and the Dangers of Evaluating Against Weak Attacks", Proceedings of the 35 th International Conference on Machine Learning, Stockholm, Sweden, PMLR 80, 2018, 10 Pages.
Kolter et al., "Provable defenses against adversarial examples via the convex outer adversarial polytope", arXiv:1711.00851v1 [cs.LG] Nov. 2, 2017, 24 pages.
Yin et al., "Gat: Generative Adversarial Training for Adversarial Example Detection and Robust Classification", Published as a conference paper at ICLR 2020, 26 Pages.
Zhang et al., "Beyond a Gaussian Denoiser: Residual Learning of Deep CNN for Image Denoising" arXiv:1608.03981v1 [cs.CV] Aug. 13, 2016, 13 Pages.

* cited by examiner

SYSTEM AND METHOD FOR IMPROVING ROBUSTNESS OF PRETRAINED SYSTEMS IN DEEP NEURAL NETWORKS UTILIZING RANDOMIZATION AND SAMPLE REJECTION

TECHNICAL FIELD

The present disclosure relates to augmentation and processing of an image (or other inputs) utilizing machine learning.

BACKGROUND

Deep learning models may be known to be vulnerable against adversarial attacks, where small imperceptible perturbations on the input image can considerably change model predictions. Many empirical defense mechanisms and training procedures have been proposed against adversarial attacks while often times stronger attacks have followed to break them. These advances have lead to defenses which provide lower bounds of robust classification accuracy, which may include randomized smoothing and such variants. Most of these defenses, however, retrain the classifiers while also sacrificing the accuracy on clean images. This may be undesirable property and limits the deployment of such defenses for several reasons. For example, retraining may require significant additional resources. Additionally, since the deployed systems would be expected to operate under normal environments most of the time, such as with clean inputs, reducing clean accuracy to such a degree means that in all likelihood these methods will not be deployed in most practical situations.

Randomized smoothing may not be, in general, directly effective on pretrained classifiers. Specifically, performance of an off-the-shelf classifier can considerably deteriorate when the input is subject to Gaussian noise (leading to small $\pi A$ and subsequently small certification radius R), as standard classifiers, in general, are not trained to be robust against Gaussian perturbations of their inputs.

In order to construct robust classifiers without altering the underlying weights of a given network f, some systems may utilize an image denoiser as a pre-processing step before passing inputs through f, where the denoiser aims at removing the Gaussian noise added to the input in randomized smoothing. Concretely, this is done by augmenting the classifier f with a custom-trained denoiser $D\theta: R^d \rightarrow R^d$, rendering the entire system as the composite function $f \circ D\theta: R^d \rightarrow Y$.

Such denoisers can be trained using various objectives subject to a varying level of complexity. The simplest objective is minimization of the mean-squared-error (MSE) of the reconstructed image, or the stability loss, which seeks the denoiser weights $\theta$ such that the classification output of the denoised images remain close to that of the original images xi (without noise).

Utilizing this objective to train the denoising module to robustify the classifier at hand has proven to be successful, while best performance is achieved by imposing up-to an order of magnitude increase in training time and complexity compared to the training time with the cheaper denoisers using the MSE loss minimization. Empirical results have shown that training the denoiser with the simple MSE loss followed by fine tuning it subject to the stability loss can give a well-traded performance in terms of its training complexity and verified robustness radius.

SUMMARY

A first illustrative embodiment discloses a computer-implemented method for training a machine-learning network includes receiving an input data from a sensor, wherein the input data is indicative of image, radar, sonar, or sound information, generating a perturbed input data set utilizing the input data, wherein the perturbed input data set includes perturbed data, denoising the perturbed input data set to generate a denoised data set, training the machine-learning network utilizing the denoised data set, wherein the machine-learning network is configured to reject the denoised data set when a classification probability falls below classification threshold, wherein the classification threshold is associated with classification the denoised data set, and in response to the classification probability falling below the classification threshold, outputting an abstain classification associated with the input data, wherein the abstain classification is ignored for classification.

A second illustrative embodiment discloses a system including a machine-learning network. The network includes an input interface configured to receive input data from a sensor, wherein the sensor includes a camera, a radar, a sonar, or a microphone, a processor, in communication with the input interface. The processor is programmed to receive the input data, wherein the input data is indicative of image, radar, sonar, or sound information, generate a perturbed input data set utilizing the input data, wherein the perturbed input data set includes perturbations of the input data, denoise the perturbed input data set utilizing a denoiser, wherein the denoiser is configured to generate a denoised data set, send the denoised data set to both a pre-trained classifier and a rejector, wherein the pre-trained classifier is configured to classify the denoised data set and the rejector is configured to reject a classification of the denoised data set, train, utilizing the denoised input data set, the a rejector to achieve a trained rejector, and in response to obtaining the trained rejector, output an abstain classification associated with the input data, wherein the abstain classification is ignored for classification.

A third illustrative embodiment discloses a computer-program product storing instructions which, when executed by a computer, cause the computer to receive input data from a sensor, wherein the input data is indicative of image, radar, sonar, or sound information, generate a perturbed input data set utilizing the input data, wherein the perturbed input data set includes perturbations of the input data, denoise the input data set utilizing a pretrained denoiser, wherein the pretrained denoiser is configured to generate a denoised data set, classify or reject the denoised data set utilizing a pretrained classifier and a rejector, train the rejector utilizing the denoised data set, wherein the rejector is configured to reject the denoised data set when a classification probability falls below classification threshold, wherein the classification threshold is associated with classification of the denoised data set, and in response to the classification probability falling below the classification threshold, output an abstain classification associated with the input data, wherein the abstain classification ignores a classification.

DETAILED DESCRIPTION

Figure 1:
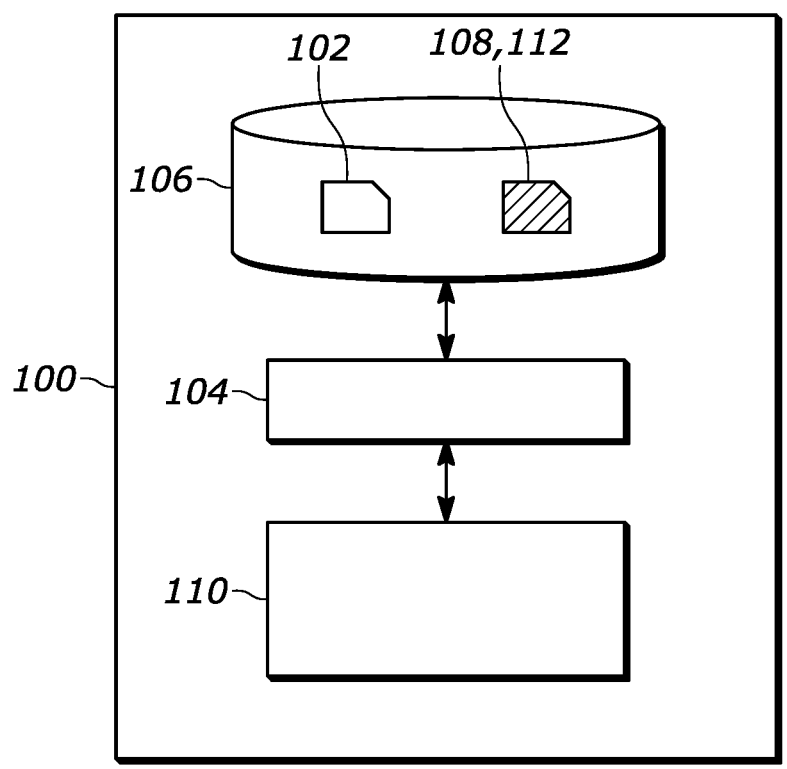
FIG. 1 shows a system 100 for training a neural network.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

This disclosure relates to a method for robustifying a pretrained neural network classification system with an abstain (rejection) option with provable robust (worst-case/adversarial) performance. The typical setup for an adversarial attack on a classifier, which we call f, may be as follows: given an input x with true label y that is correctly classified by f (meaning, (x)=y), the attacker may aim to find a small (ideally human-imperceptible) perturbation δ such that x+δ is incorrectly classified by C (that is, f (x+δ)≠y)). Robustness may be claimed when there can be no such perturbations that change the classification outcome, in other words, all perturbed inputs within the "admissible perturbations set" give the original outcome as that of the clean (unperturbed) input.

A number of works (without rejection/abstain/detection) have proposed training procedures under which the resulting robustified classifier has provable performance, i.e. an upper bound on the error rate (misclassification probability) for adversarially perturbed images subject to norm constraint on the perturbation. When randomization is used to provide robustness may provide: (1) a clean input image is perturbed and classified for different realization of a Gaussian noise, (1) the probability of the majority class and the runner up class are estimated, and (3) provable guarantees for robustness is computed. Such networks need to be trained with such Gaussian-perturbation augmentations for non-trivial performance.

In addition it is of interest to robustify a pretrained network against adversarial perturbations. One embodiment may propose to do this by leveraging the randomization idea together with adding a denoiser module to the system.

Finally, in practice it is of interest to detect adversarially perturbed examples. However, all the available detection methods in the literature lack provable performance, and have been shown to fail detection if the attacker devises carefully crafted "adaptive perturbations" to simultaneously evade detection and cause misclassification.

Some embodiments propose training a classifier with an extra class, i.e., K+1 classes for a K-class classification task, where the extra class is referred to as the "abstain-class". By classifying an image in this class, the classifier is in fact abstaining from declaring the input as any of the other K-classes, and thus can be thought of as abstaining (or detecting or rejecting) the adversarial input. This work however has no provable performance guarantees, and its training process is different than the one proposed in this invention.

The disclosure formulates a provable robust training procedure for robustifying pretrained neural networks against adversarial attacks. The proposed system may be comprised of (1) the pretrained-classifier, (2) the pretrained denoiser (image to image convertor), and (3) the proposed module: a per-class rejector.

The system and method may utilize an approach to leverage a rejection class together with denoised smoothing to keep its desirable properties (namely, being able to produce robust versions of pretrained classifiers), while improving the accuracy, especially clean accuracy, of the resulting system.

The system may robustify pretrained classifiers with sample rejection while providing certifiable accuracy. One key to such an approach is to use a reject class, realized through cheaply-trainable per-class rejectors, which are trained to reject noisy samples whose prediction is inconsistent with the prediction of the clean sample. Inevitably this can also lead to a small number of correctly classified samples to also get rejected, however, the overall certification radius with a pretrained denoiser is improved since: (a) the reject class is used to provide a lower (and tighter) upper bound on the wrong class probabilities, and subsequently (b) the lowered probability of the runner-up class leads to higher certification radius due to its non-linear dependence via the inverse Gaussian CDF function.

To this end, the full system for every perturbation can be viewed as a classifier augmented with a denoiser and detector/rejector modules: resulting in a (K+1)-class classifier for an originally (K)-class classification task.

(1) The image will be perturbed N number of times, and every perturbation will be classified into one of these (K+1) classes, where the additional class is referred to as abstain/detection/rejection-class.

(2) The final classification outcome is any of the K (original, thus excluding the rejection class) classes, which has the majority vote.

(3) Probability of the runner up class as well as the rejection class is estimated, and the utilization of these joint quantities leads to improved performance and higher certification radius compared to state of the art.

(4) Imperative to the proposed method is to train the proposed rejector module to discriminate (classify) correctly-classified vs. misclassified randomly perturbed images.

The embodiments disclosed enable detection of adversarial inputs by classifying them in the rejection class. Furthermore, it provides provable guarantees on the performance of the classifier by giving a certificate that all possible perturbations within a family of perturbations will be correctly-classified, thus guaranteeing unsuccessful attack by the adversary. This provides additional boost in performance guarantee achieved by other techniques without the detection capability.

Another important aspect of his work is the ability to robustify pre-trained off-the-shelf classifiers and denoisers. This is of high importance when changing the weight of the classifier and/or detector is infeasible due to cost/privacy/etc.

This can also be used in detecting adversarial environments, and thus used for demanding manual control for safety-critical tasks by interpreting the detection of adversaries as unsafe/adversarial environment.

Also, abstaining from classification is sometimes interpreted as the classifier declaring its lack of certainty in the outcome of the classification task, and thus can be used for declaring high uncertainty.

In one embodiment, the system may allow for randomized smoothing. For example, consider a classification problem from $R^d$ to classes $Y:=\{1,2,\ldots,K\}$. According to the randomized smoothing method, one can construct a "smoothed" classifier g from an arbitrary base classifier f by defining $$g(x) = \underset{c \in Y}{\max P}(f(x+\epsilon) = c) \text{ where } \epsilon \sim N(0, \sigma^2 I).$$

That is, the smoothed classifier g returns the class that the base classifier f is most likely to return around the neighborhood of x, where the density of samples in the neighborhood is represented as Gaussian Noise $\epsilon \sim N(0, \sigma^2 I)$ One advantage of the randomized-smoothing method is its inherent capability in providing certifiable robustness against bounded $\ell$ 2—norm worst-case perturbations. Formally, for any deterministic or random function $f:R^d \to Y:=\{1,2,\ldots,K\}$, suppose $c_A, c_B \in Y$ and $\pi_A, \pi_B \in [0,1]$ satisfy:

$$P(f(x+\epsilon) = c_A) \geq \pi_A \geq \pi_B \geq \underset{c \neq c_A}{\max} P(f(x+\epsilon) = c)$$

In one example, a tight verification bound may be utilized as follows: $g(x+\delta)=c_A$ for all $\|\delta\| \leq R$, where $$R = \frac{\sigma}{2}(\Phi^{-1}(\pi_A) - \Phi^{-1}(\pi_B))$$

and $\Phi^{-1}(.)$ is the inverse of the standard Gaussian CDF.

Since computing exact values of $\pi_A = P(f(x+\epsilon)=c_A)$ and $\pi_B = P(f(x+\epsilon)=c_B)$ is not practical, Monte Carlo sampling is used to estimate the class with the highest probability with arbitrarily high confidence, followed by approximating $\pi_B = 1 - \pi_A$ yielding $$R = \sigma \Phi^{-1}(\pi_A)$$

Practically, although the above results hold for any function f, one needs to train the base classifier f against Gaussian perturbations for effective certification, as using standard classifiers usually lead to trivial certification bounds because they are not robust against Gaussian noise. Increasing confidence of the certification can be achieved by running a larger number of samples in the Monte Carlo estimation, which then leads to an increase in inference time. Furthermore, although the above results hold for any function f one needs to train the base classifier f against Gaussian perturbations for effective certification, as using standard classifiers usually lead to trivial certification bounds because they are not robust against Gaussian noise.

FIG. 1 shows a system 100 for training a neural network. The system 100 may comprise an input interface for accessing training data 192 for the neural network. For example, as illustrated in FIG. 1, the input interface may be constituted by a data storage interface 180 which may access the training data 192 from a data storage 190. For example, the data storage interface 180 may be a memory interface or a persistent storage interface, e.g., a hard disk or an SSD interface, but also a personal, local or wide area network interface such as a Bluetooth, Zigbee or Wi-Fi interface or an ethernet or fiberoptic interface. The data storage 190 may be an internal data storage of the system 100, such as a hard drive or SSD, but also an external data storage, e.g., a network-accessible data storage.

In some embodiments, the data storage 190 may further comprise a data representation 194 of an untrained version of the neural network which may be accessed by the system 100 from the data storage 190. It will be appreciated, however, that the training data 192 and the data representation 194 of the untrained neural network may also each be accessed from a different data storage, e.g., via a different subsystem of the data storage interface 180. Each subsystem may be of a type as is described above for the data storage interface 180. In other embodiments, the data representation 194 of the untrained neural network may be internally generated by the system 100 on the basis of design parameters for the neural network, and therefore may not explicitly be stored on the data storage 190. The system 100 may further comprise a processor subsystem 160 which may be configured to, during operation of the system 100, provide an iterative function as a substitute for a stack of layers of the neural network to be trained. Here, respective layers of the stack of layers being substituted may have mutually shared weights and may receive, as input, an output of a previous layer, or for a first layer of the stack of layers, an initial activation, and a part of the input of the stack of layers. The processor subsystem 160 may be further configured to iteratively train the neural network using the training data 192. Here, an iteration of the training by the processor subsystem 160 may comprise a forward propagation part and a backward propagation part. The processor subsystem 160 may be configured to perform the forward propagation part by, amongst other operations defining the forward propagation part which may be performed, determining an equilibrium point of the iterative function at which the iterative function converges to a fixed point, wherein determining the equilibrium point comprises using a numerical root-finding algorithm to find a root solution for the iterative function minus its input, and by providing the equilibrium point as a substitute for an output of the stack of layers in the neural network. The system 100 may further comprise an output interface for outputting a data representation 196 of the trained neural network, this data may also be referred to as trained model data 196. For example, as also illustrated in FIG. 1, the output interface may be constituted by the data storage interface 180, with said interface being in these embodiments an input/output ("IO") interface, via which the trained model data 196 may be stored in the data storage 190. For example, the data representation 194 defining the 'untrained' neural network may during or after the training be replaced, at least in part by the data representation 196 of the trained neural network, in that the parameters of the neural network, such as weights, hyperparameters and other types of parameters of neural networks, may be adapted to reflect the training on the training data 192. This is also illustrated in FIG. 1 by the reference numerals 194, 196 referring to the same data record on the data storage 190. In other embodiments, the data representation 196 may be stored separately from the data representation 194 defining the 'untrained' neural network. In some embodiments, the output interface may be separate from the data storage interface 180, but may in general be of a type as described above for the data storage interface 180.

Figure 2:
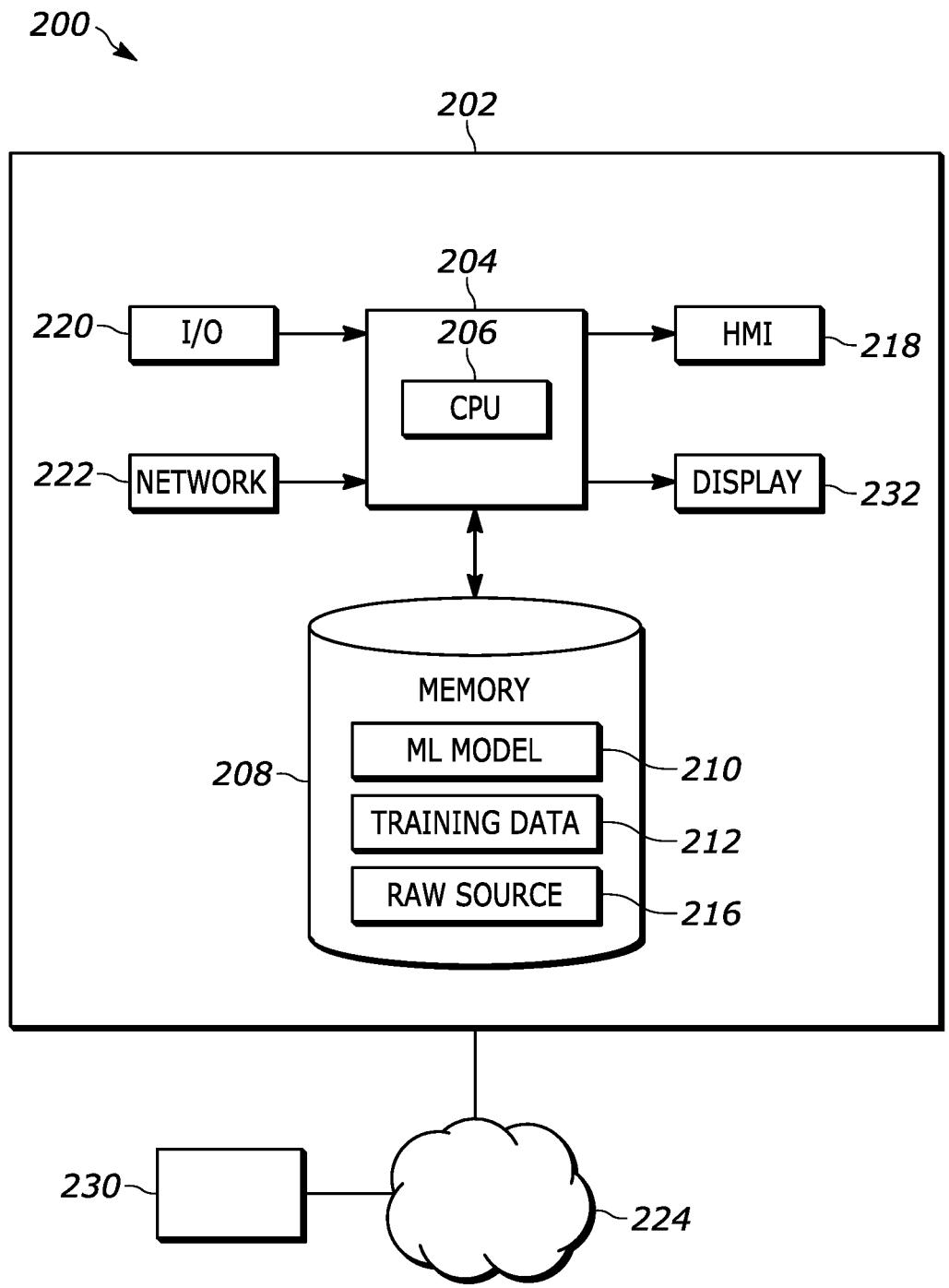
FIG. 2 shows a computer-implemented method 200 for training a neural network.

FIG. 2 depicts a data annotation system 200 to implement a system for annotating data. The data annotation system 200 may include at least one computing system 202. The computing system 202 may include at least one processor 204 that is operatively connected to a memory unit 208. The processor 204 may include one or more integrated circuits that implement the functionality of a central processing unit (CPU) 206. The CPU 206 may be a commercially available processing unit that implements an instruction stet such as one of the x86, ARM, Power, or MIPS instruction set families. During operation, the CPU 206 may execute stored program instructions that are retrieved from the memory unit 208. The stored program instructions may include software that controls operation of the CPU 206 to perform the operation described herein. In some examples, the processor 204 may be a system on a chip (SoC) that integrates functionality of the CPU 206, the memory unit 208, a network interface, and input/output interfaces into a single integrated device. The computing system 202 may implement an operating system for managing various aspects of the operation.

The memory unit 208 may include volatile memory and non-volatile memory for storing instructions and data. The non-volatile memory may include solid-state memories, such as NAND flash memory, magnetic and optical storage media, or any other suitable data storage device that retains data when the computing system 202 is deactivated or loses electrical power. The volatile memory may include static and dynamic random-access memory (RAM) that stores program instructions and data. For example, the memory unit 208 may store a machine-learning model 210 or algorithm, a training dataset 212 for the machine-learning model 210, raw source dataset 215.

The computing system 202 may include a network interface device 222 that is configured to provide communication with external systems and devices. For example, the network interface device 222 may include a wired and/or wireless Ethernet interface as defined by Institute of Electrical and Electronics Engineers (IEEE) 802.11 family of standards. The network interface device 222 may include a cellular communication interface for communicating with a cellular network (e.g., 3G, 4G, 5G). The network interface device 222 may be further configured to provide a communication interface to an external network 224 or cloud.

The external network 224 may be referred to as the world-wide web or the Internet. The external network 224 may establish a standard communication protocol between computing devices. The external network 224 may allow information and data to be easily exchanged between computing devices and networks. One or more servers 330 may be in communication with the external network 224.

The computing system 202 may include an input/output (I/O) interface 220 that may be configured to provide digital and/or analog inputs and outputs. The I/O interface 220 may include additional serial interfaces for communicating with external devices (e.g., Universal Serial Bus (USB) interface).

The computing system 202 may include a human-machine interface (HMI) device 218 that may include any device that enables the system 200 to receive control input. Examples of input devices may include human interface inputs such as keyboards, mice, touchscreens, voice input devices, and other similar devices. The computing system 202 may include a display device 232. The computing system 202 may include hardware and software for outputting graphics and text information to the display device 232. The display device 232 may include an electronic display screen, projector, printer or other suitable device for displaying information to a user or operator. The computing system 202 may be further configured to allow interaction with remote HMI and remote display devices via the network interface device 222.

The system 200 may be implemented using one or multiple computing systems. While the example depicts a single computing system 202 that implements all of the described features, it is intended that various features and functions may be separated and implemented by multiple computing units in communication with one another. The particular system architecture selected may depend on a variety of factors.

The system 200 may implement a machine-learning algorithm 210 that is configured to analyze the raw source dataset 215. The raw source dataset 215 may include raw or unprocessed sensor data that may be representative of an input dataset for a machine-learning system. The raw source dataset 215 may include video, video segments, images, text-based information, and raw or partially processed sensor data (e.g., radar map of objects). In some examples, the machine-learning algorithm 210 may be a neural network algorithm that is designed to perform a predetermined function. For example, the neural network algorithm may be configured in automotive applications to identify pedestrians in video images.

The computer system 200 may store a training dataset 212 for the machine-learning algorithm 210. The training dataset 212 may represent a set of previously constructed data for training the machine-learning algorithm 210. The training dataset 212 may be used by the machine-learning algorithm 210 to learn weighting factors associated with a neural network algorithm. The training dataset 212 may include a set of source data that has corresponding outcomes or results that the machine-learning algorithm 210 tries to duplicate via the learning process. In this example, the training dataset 212 may include source videos with and without pedestrians and corresponding presence and location information. The source videos may include various scenarios in which pedestrians are identified.

The machine-learning algorithm 210 may be operated in a learning mode using the training dataset 212 as input. The machine-learning algorithm 210 may be executed over a number of iterations using the data from the training dataset 212. With each iteration, the machine-learning algorithm 210 may update internal weighting factors based on the achieved results. For example, the machine-learning algorithm 210 can compare output results (e.g., annotations) with those included in the training dataset 212. Since the training dataset 212 includes the expected results, the machine-learning algorithm 210 can determine when performance is acceptable. After the machine-learning algorithm 210 achieves a predetermined performance level (e.g., 100% agreement with the outcomes associated with the training dataset 212), the machine-learning algorithm 210 may be executed using data that is not in the training dataset 212. The trained machine-learning algorithm 210 may be applied to new datasets to generate annotated data.

The machine-learning algorithm 210 may be configured to identify a particular feature in the raw source data 215. The raw source data 215 may include a plurality of instances or input dataset for which annotation results are desired. For example, the machine-learning algorithm 210 may be configured to identify the presence of a pedestrian in video images and annotate the occurrences. The machine-learning algorithm 210 may be programmed to process the raw source data 215 to identify the presence of the particular features. The machine-learning algorithm 210 may be configured to identify a feature in the raw source data 215 as a predetermined feature (e.g., pedestrian). The raw source data 215 may be derived from a variety of sources. For example, the raw source data 215 may be actual input data collected by a machine-learning system. The raw source data 215 may be machine generated for testing the system. As an example, the raw source data 215 may include raw video images from a camera.

In the example, the machine-learning algorithm 210 may process raw source data 215 and output an indication of a representation of an image. The output may also include augmented representation of the image. A machine-learning algorithm 210 may generate a confidence level or factor for each output generated. For example, a confidence value that exceeds a predetermined high-confidence threshold may indicate that the machine-learning algorithm 210 is confident that the identified feature corresponds to the particular feature. A confidence value that is less than a low-confidence threshold may indicate that the machine-learning algorithm 210 has some uncertainty that the particular feature is present.

Figure 3:
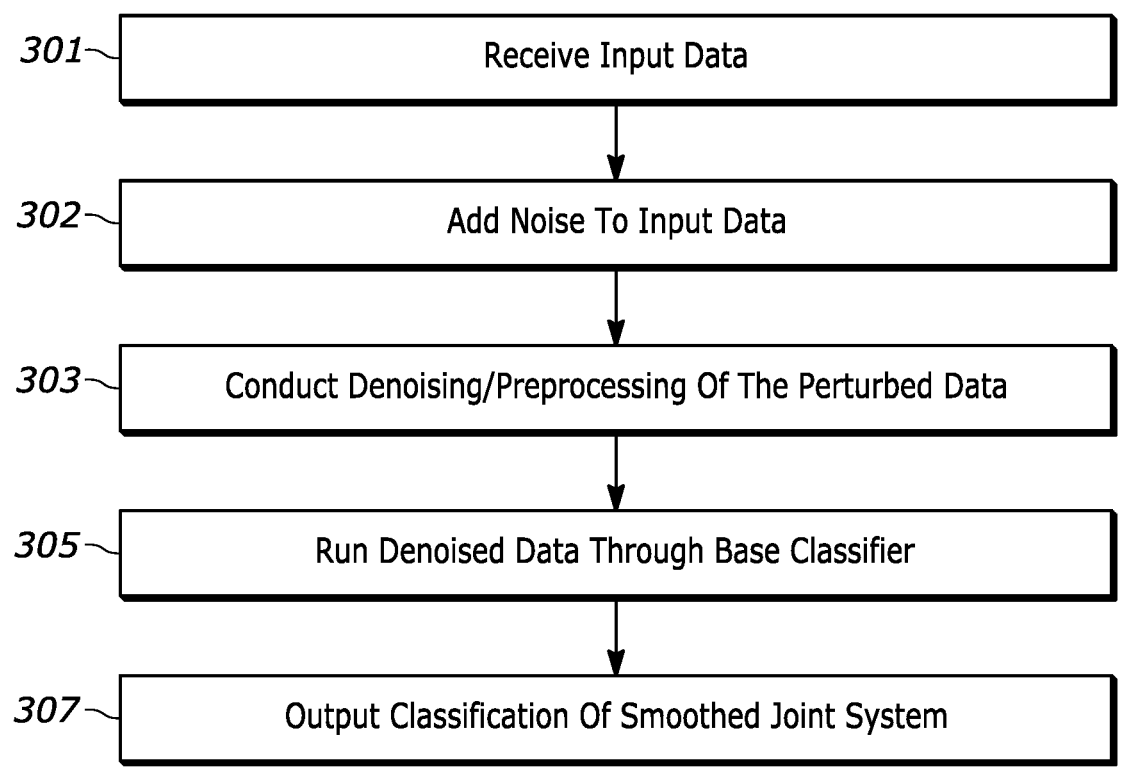
FIG. 3 illustrates a flow chart of a hybrid unsupervised semantic segmentation.
Figure 4:
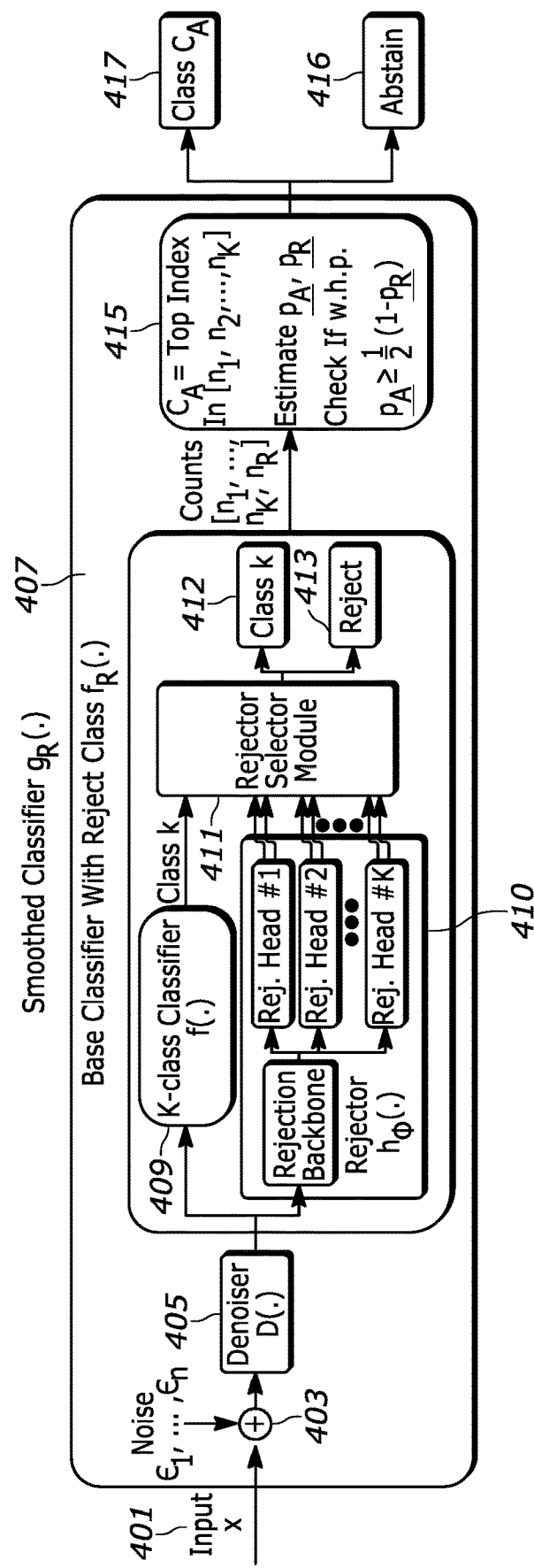
FIG. 4 illustrates a flow chart for training a network utilizing the hybrid unsupervised semantic segmentation.

FIG. 3 illustrates an embodiment of a flowchart as related to robustifying pretrained classifiers. At step 301, the input (e.g. image or similar data) x may be received at a processor, computer, server, etc. At step 302, the input may be perturbed by noise E. At step 303, the perturbed data may pass through the preprocessing (e.g., denoising) step via D(x+). The denoiser may be a pre-trained denoiser. At step 305, the resulting denoised data may go through the base classifier with a reject class. The base classifier may include both a pre-trained classifier (e.g., K-class classifier) and a rejector. The rejector may be trained to successfully discriminate between the correctly classified and mis-classified denoised inputs that are assigned to class k by the base classifier f(.). At step 307, the classification output of the smoothed joint system of (D, f, $\{h_k\}_{k=1}^{L}$) may be claimed as the most likely class over the noise distribution (or it empirical realization via N i.i.d. samples). The schematic of such a system is shown in FIG. 4 below, and he overall system may be defined as $$S = \left\{ D, f, \{h_k\}_{k=1}^{K} \right\}.$$

In such an embodiment, the pretrained K-class classifier and pretrained denoiser are augmented with a per-class rejector- that is a binary detector for each of the original K classes. We aim to improve certification accuracy of pretrained classifiers by incorporating an explicit 'reject' class into the base classifier, while preserving the certifiability against worst-case perturbations with bounded 12-norm.

The proposed classification procedure for the full system containing classifier f, denoiser D, rejectors $\{h_1, \ldots, k_K\}$ the image x will go through the following steps: (a) it is first perturbed by noise $\epsilon$ drawn from Gaussian noise with variance $\sigma^2$. (b) noisy image passes through the image preprocessing (denoising) step via D(x+$\epsilon$) (c) the resulting denoised image goes through $f_R(D(x+\epsilon))$ denoting the base-classifier-with-rejection defined as $$f_{R(z)} = \begin{cases} c_k & \text{if } f(x+\epsilon)=c_k \text{ and } h_k(x+\epsilon)=0 \\ R & \text{if } f(x+\epsilon)=c_k \text{ and } h_k(x+\epsilon)=1 \end{cases}$$

(d) finally, the classification output of the smoothed joint system is claimed as the most likely class over the noise distribution (or it empirical realization via N i.i.d. samples, that is: repeat steps a-c for a total of N times with different noise realizations and take the majority class).

The schematic depicts a visual placement of the components in the overall system denoted as S={f,D,$h_1, \ldots, h_K$}.

Algorithm 1,2,3 provide the pseudocode for the prediction and certification of the overall system, where function LowerConfBound(S,n, 1–a) returns a one-sided 1–a lower confidence interval for the Binomial parameter q given a sample s~Binomial(n,q).

---

Algorithm 1 Sampling under noise for the overall system
S = {D, f, $\{h_k\}_{k=1}^K$}

--- function SAMPLEUNDERNOISE (S, x, n, σ)
Initialize count= [O, ..., O]$_{K+1 \times 1}$
for v = 1, ..., n do
   sample noise $\epsilon_v \in$ N (0, $\sigma^2$I)
   k ← f (D (x + $\epsilon_v$))
   if $h_k$(D(x + $\epsilon_v$)) = 0 then
   ++ counts [k]
   else
   ++ counts [R]
   end if
end for
return count

---

Algorithm 1 Certification and prediction

--- predict for x; using $g_R$
function PREDICT (S = {D, f, $\{h_k\}_{k=1}^K$}, σ, x, N)
   counts ← SAMPLEUNDERNOISE (S, σ, x, N)
   $\widehat{c_A}, \widehat{c_B}$ ← top two indices in counts
   $n_A, n_B$ ← counts[$\widehat{c_A}$], counts[$\widehat{c_B}$]

-continued

```
Algorithm 1 Certification and prediction

If BINOMPVALUE (n_A, n_A + n_B, 0.5) ≤ α then
        return ĉ_A;
    else
        return ABSTAIN
    end if
    # certify the robustness of g_R around x
    function CERTIFY(S = {D, f{h_k}_{k=1}^K}, σ, x, N, α)

counts ← SAMPLEUNDERNOISE (S, σ, x, N)
        ĉ_A ← top index in counts O
        n_A, n_B ← counts[ĉ_A], counts [R]
        p_A ← LOWERCONFBOUND (n_A, N, 1 − α)
        p_R ← LOWERCONFBOUND (n_R, N, 1 − α)
        p_{A+R} ← LOWERCONFBOUND (n_A + n_R, N, 1 − α)
        if p_A > (1 − p_R) then
            return ĉ_A, R̂ = σ/2 (Φ^{-1}(p_A) + Φ^{-1}(p_{A+R}))
        else
            return ABSTAIN
        end if
```

To train the rejectors, the parameters of the rejector networks $\{h_1, \ldots h_K\}$ are learned by training them to discriminate the correctly classified vs misclassified noisy samples. That is, concretely define the classification loss for rejector $h_k$ as $$L_{\phi k} = \ell_{cross-entropy}(H_k(D(x_i+\epsilon)), b_i)$$

where $H_k$ is the softmax outputs of rejector k, and the target label $b_i$ for image $x_i$ is defined as $$b_i = \begin{cases} 1 & \text{if } f(D(x_i + \epsilon)) \neq f(x_i) \\ 0 & \text{otherwise} \end{cases}$$

That is, target label $b_i$=0 if the classifier f has classified denoised input to the same class as that of the noise-free image, and 1 otherwise, thus rejecting the noisy images whose classification outcome has changed.

The total loss aggregated over the entire set of data with all possible K classes, yields $$L_\phi = E_{x_i, \epsilon}\left[\sum_{k=1}^K L_{\phi_k} \times 1_{\{f(x_i)=k\}}\right]$$

where the parameter set $\phi = \{\phi_1, \ldots, \phi_K\}$ captures the set of parameters of all the K rejectors.

In order to make the training more affordable, we propose to tie the K rejectors through a shared backbone $h_{BB}$ parameterized by $\phi_{BB}$ and define each $h_k$ by adding a fully-connected layer parameterized by $\omega_k$ to the features extracted via the backbone network.

FIG. 4 illustrates an embodiment of a diagram according to an embodiment. The system may receive an input 401. The input 401 may include data from one or more sensors, such as video data, radar, LiDAR, ultrasonic, motion, thermal imaging cameras, etc. Noise 403 may be added to the input to help in the robustification process of the pretrained neural network against adversarial attacks. The system may then use a pretrained denoiser 405. The pretrained denoiser 405 may be an image to image convertor and thus utilizing image preprocessing to create a denoised image or denoised image set. In order to construct robust classifiers without altering the underlying weights of a given network f, a system may utilize an image denoisier 405 as a pre-processing step before passing inputs through f, where the denoiser 405 aims at removing the Gaussian noise added to the input in randomized smoothing. Concretely, this is done by augmenting the classifier f with a custom-trained denoiser $D_\theta: \mathbb{R}^d \to \mathbb{R}^d$, rendering the entire system as the composite function $f \circ D_\theta: \mathbb{R}^d \to Y$. The image or input 401 may be perturbed N number of times, and every perturbation may be classified into one of the (K+1) classes. The additional class may be referred to as an abstain/detection/rejection-class.

The K-class classifier 409 (which may be pretrained) and denoiser 405 may be augmented with a per-class rejector 410. The rejector 410 may be a binary detector for each of the original K classes. The system may work to train the rejector 410 utilizing each of the iterations of the data that has noise added and that is pre-processed via the denoiser. The system may aim to improve certification accuracy of pretrained classifiers by incorporating an explicit 'reject' class into the base classifier, while preserving the certifiability against worst-case perturbations with bounded 12-norm. The rejector module 411 may be utilized to train the proposed rejector module to discriminate (classify) correctly-classified vs. misclassified randomly perturbed images. The rejector selector module 411 may work with both the pre-trained classifier 409 and the In order to make the training more affordable, the system may tie the K rejectors through a shared backbone 410. The system may thus reject to classify the inputs which are likely to be mis-classified. The rejector or rejectors 410 may be utilized in blocking such inputs. The rejector selector module will either output a class k 412 or a rejection 413 associated with the input. The various iterations of the input data that is added different iterations of noise (e.g. perturbed) and preprocessed may be used n times.

At 415, the system and classifier may work to certify and predict both a final class 417 and abstain classification 416. The system may sample the various counts of the perturbed data that is denoised. It may then determine the appropriate bound to certify the robustness of the input. To the extent that the input is not certified, it may be returned as a misclassification or an abstain class.

Thus, the system may aim to improve certification accuracy of pretrained classifiers by incorporating an explicit 'reject' class into the base classifier, while preserving the certifiability against worst-case perturbations with bounded 12-norm. To this end, let h: $\mathbb{R}^d \to \{0, 1\}$ may denote a general function with binary outputs, which effectively 'flags' the input x if h(x)=1, thus assigning it to the reject class; while h(x)=0 indicates allowing the input to pass and thus not rejecting it. Thus, the system and algorithm may effectively train and operate such a 'rejector' in conjunction with pretrained denoised smoothing in order to improve the robust performance of a pretrained classifier.

Figure 5:
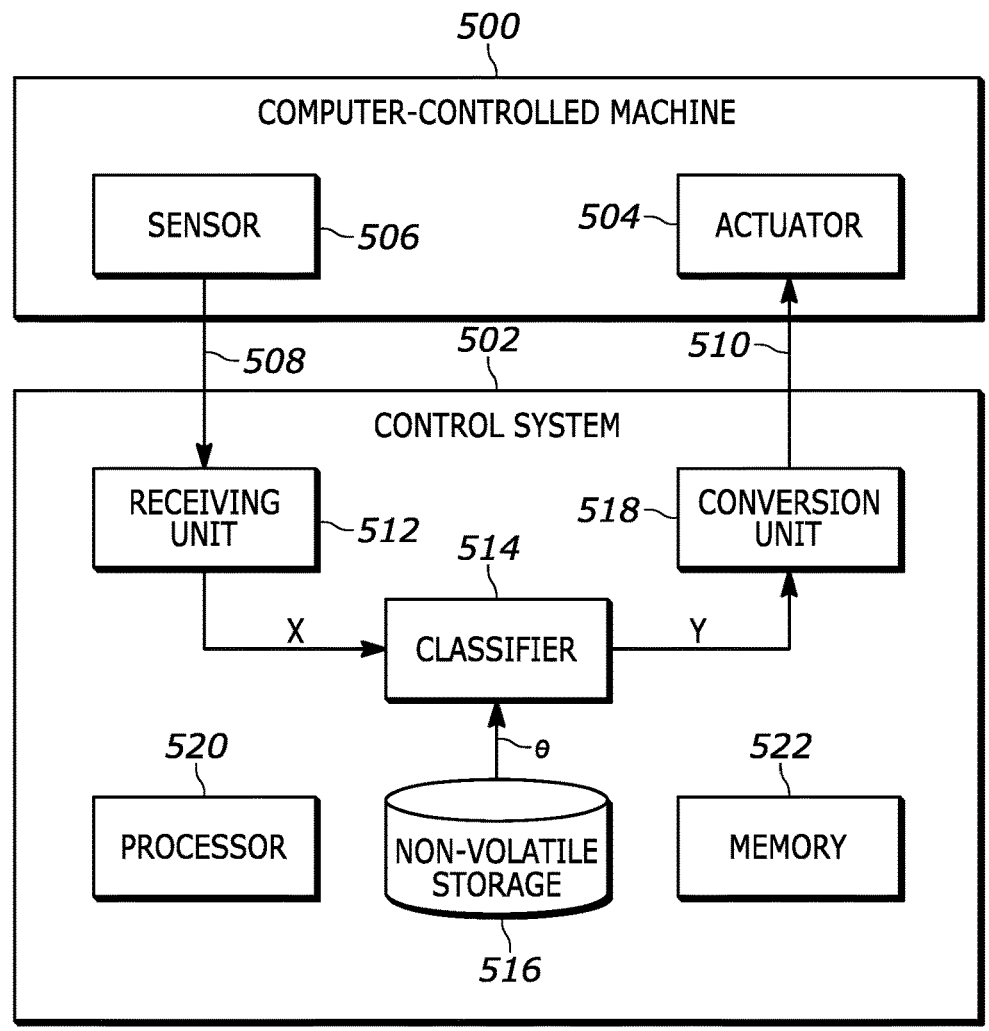
FIG. 5 depicts a schematic diagram of an interaction between computer-controlled machine 10 and control system 12.

FIG. 5 depicts a schematic diagram of an interaction between computer-controlled machine 500 and control system 502. Computer-controlled machine 500 includes actuator 504 and sensor 506. Actuator 504 may include one or more actuators and sensor 506 may include one or more sensors. Sensor 506 is configured to sense a condition of computer-controlled machine 500. Sensor 506 may be configured to encode the sensed condition into sensor signals 508 and to transmit sensor signals 508 to control system 502. Non-limiting examples of sensor 506 include video, radar, LiDAR, ultrasonic and motion sensors. In one embodiment, sensor 506 is an optical sensor configured to sense optical images of an environment proximate to computer-controlled machine 500.

Control system 502 is configured to receive sensor signals 508 from computer-controlled machine 500. As set forth below, control system 502 may be further configured to compute actuator control commands 510 depending on the sensor signals and to transmit actuator control commands 510 to actuator 504 of computer-controlled machine 500.

As shown in FIG. 5, control system 502 includes receiving unit 512. Receiving unit 512 may be configured to receive sensor signals 508 from sensor 506 and to transform sensor signals 508 into input signals x. In an alternative embodiment, sensor signals 508 are received directly as input signals x without receiving unit 512. Each input signal x may be a portion of each sensor signal 508. Receiving unit 512 may be configured to process each sensor signal 508 to product each input signal x. Input signal x may include data corresponding to an image recorded by sensor 506.

Control system 502 includes classifier 514. Classifier 514 may be configured to classify input signals x into one or more labels using a machine learning (ML) algorithm, such as a neural network described above. Classifier 514 is configured to be parametrized by parameters, such as those described above (e.g., parameter θ). Parameters θ may be stored in and provided by non-volatile storage 516. Classifier 514 is configured to determine output signals y from input signals x. Each output signal y includes information that assigns one or more labels to each input signal x. Classifier 514 may transmit output signals y to conversion unit 518. Conversion unit 518 is configured to covert output signals y into actuator control commands 510. Control system 502 is configured to transmit actuator control commands 510 to actuator 504, which is configured to actuate computer-controlled machine 500 in response to actuator control commands 510. In another embodiment, actuator 504 is configured to actuate computer-controlled machine 500 based directly on output signals y.

Upon receipt of actuator control commands 510 by actuator 504, actuator 504 is configured to execute an action corresponding to the related actuator control command 510. Actuator 504 may include a control logic configured to transform actuator control commands 510 into a second actuator control command, which is utilized to control actuator 504. In one or more embodiments, actuator control commands 510 may be utilized to control a display instead of or in addition to an actuator.

In another embodiment, control system 502 includes sensor 506 instead of or in addition to computer-controlled machine 500 including sensor 506. Control system 502 may also include actuator 504 instead of or in addition to computer-controlled machine 500 including actuator 504.

As shown in FIG. 5, control system 502 also includes processor 520 and memory 522. Processor 520 may include one or more processors. Memory 522 may include one or more memory devices. The classifier 514 (e.g., ML algorithms) of one or more embodiments may be implemented by control system 502, which includes non-volatile storage 516, processor 520 and memory 522.

Non-volatile storage 516 may include one or more persistent data storage devices such as a hard drive, optical drive, tape drive, non-volatile solid-state device, cloud storage or any other device capable of persistently storing information. Processor 520 may include one or more devices selected from high-performance computing (HPC) systems including high-performance cores, microprocessors, microcontrollers, digital signal processors, microcomputers, central processing units, field programmable gate arrays, programmable logic devices, state machines, logic circuits, analog circuits, digital circuits, or any other devices that manipulate signals (analog or digital) based on computer-executable instructions residing in memory 522. Memory 522 may include a single memory device or a number of memory devices including, but not limited to, random access memory (RAM), volatile memory, non-volatile memory, static random access memory (SRAM), dynamic random access memory (DRAM), flash memory, cache memory, or any other device capable of storing information.

Processor 520 may be configured to read into memory 522 and execute computer-executable instructions residing in non-volatile storage 516 and embodying one or more ML algorithms and/or methodologies of one or more embodiments. Non-volatile storage 516 may include one or more operating systems and applications. Non-volatile storage 516 may store compiled and/or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

Upon execution by processor 520, the computer-executable instructions of non-volatile storage 516 may cause control system 502 to implement one or more of the ML algorithms and/or methodologies as disclosed herein. Non-volatile storage 516 may also include ML data (including data parameters) supporting the functions, features, and processes of the one or more embodiments described herein.

The program code embodying the algorithms and/or methodologies described herein is capable of being individually or collectively distributed as a program product in a variety of different forms. The program code may be distributed using a computer readable storage medium having computer readable program instructions thereon for causing a processor to carry out aspects of one or more embodiments. Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. Computer readable program instructions may be downloaded to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions, acts, and/or operations specified in the flowcharts or diagrams. In certain alternative embodiments, the functions, acts, and/or operations specified in the flowcharts and diagrams may be re-ordered, processed serially, and/or processed concurrently consistent with one or more embodiments. Moreover, any of the flowcharts and/or diagrams may include more or fewer nodes or blocks than those illustrated consistent with one or more embodiments.

The processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

Figure 6:
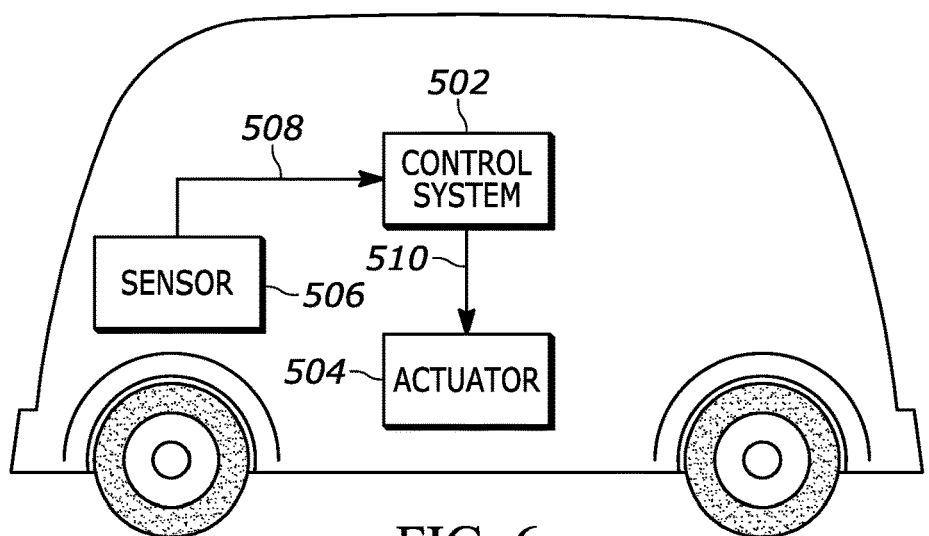
FIG. 6 depicts a schematic diagram of the control system of FIG. 1 configured to control a vehicle, which may be a partially autonomous vehicle or a partially autonomous robot.

FIG. 6 depicts a schematic diagram of control system 502 configured to control vehicle 600, which may be an at least partially autonomous vehicle or an at least partially autonomous robot. Vehicle 600 includes actuator 504 and sensor 506. Sensor 506 may include one or more video sensors, cameras, radar sensors, ultrasonic sensors, LiDAR sensors, and/or position sensors (e.g. GPS). One or more of the one or more specific sensors may be integrated into vehicle 600. Alternatively or in addition to one or more specific sensors identified above, sensor 506 may include a software module configured to, upon execution, determine a state of actuator 504. One non-limiting example of a software module includes a weather information software module configured to determine a present or future state of the weather proximate vehicle 600 or other location.

Classifier 514 of control system 502 of vehicle 600 may be configured to detect objects in the vicinity of vehicle 600 dependent on input signals x. In such an embodiment, output signal y may include information characterizing the vicinity of objects to vehicle 600. Actuator control command 510 may be determined in accordance with this information. The actuator control command 510 may be used to avoid collisions with the detected objects.

In embodiments where vehicle 600 is an at least partially autonomous vehicle, actuator 504 may be embodied in a brake, a propulsion system, an engine, a drivetrain, or a steering of vehicle 600. Actuator control commands 510 may be determined such that actuator 504 is controlled such that vehicle 600 avoids collisions with detected objects. Detected objects may also be classified according to what classifier 514 deems them most likely to be, such as pedestrians or trees. The actuator control commands 510 may be determined depending on the classification. In a scenario where an adversarial attack may occur, the system described above may be further trained to better detect objects or identify a change in lighting conditions or an angle for a sensor or camera on vehicle 600.

In other embodiments where vehicle 600 is an at least partially autonomous robot, vehicle 600 may be a mobile robot that is configured to carry out one or more functions, such as flying, swimming, diving and stepping. The mobile robot may be an at least partially autonomous lawn mower or an at least partially autonomous cleaning robot. In such embodiments, the actuator control command 510 may be determined such that a propulsion unit, steering unit and/or brake unit of the mobile robot may be controlled such that the mobile robot may avoid collisions with identified objects.

In another embodiment, vehicle 600 is an at least partially autonomous robot in the form of a gardening robot. In such embodiment, vehicle 600 may use an optical sensor as sensor 506 to determine a state of plants in an environment proximate vehicle 600. Actuator 504 may be a nozzle configured to spray chemicals. Depending on an identified species and/or an identified state of the plants, actuator control command 510 may be determined to cause actuator 504 to spray the plants with a suitable quantity of suitable chemicals.

Vehicle 600 may be an at least partially autonomous robot in the form of a domestic appliance. Non-limiting examples of domestic appliances include a washing machine, a stove, an oven, a microwave, or a dishwasher. In such a vehicle 600, sensor 506 may be an optical sensor configured to detect a state of an object which is to undergo processing by the household appliance. For example, in the case of the domestic appliance being a washing machine, sensor 506 may detect a state of the laundry inside the washing machine. Actuator control command 510 may be determined based on the detected state of the laundry.

Figure 7:
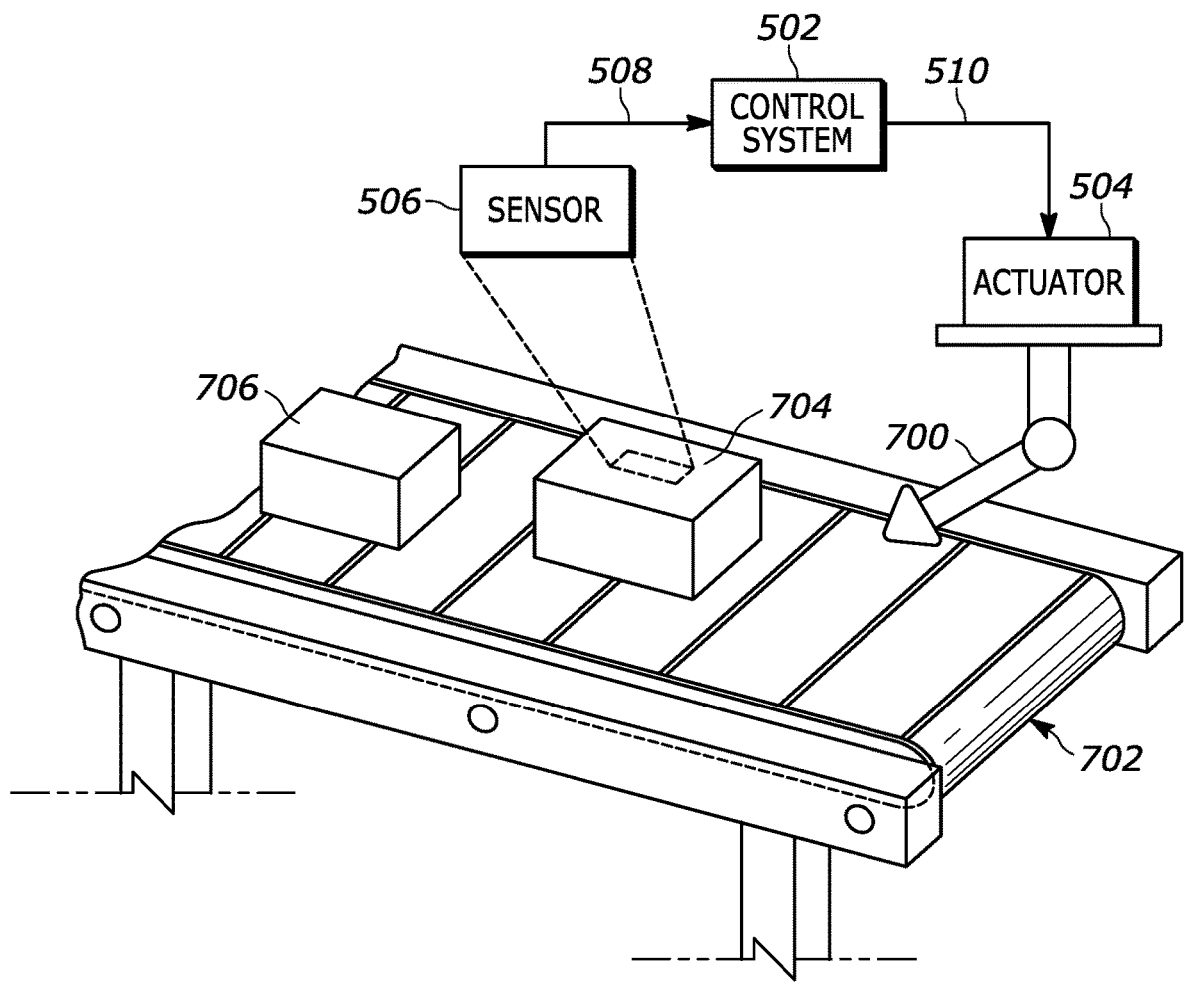
FIG. 7 depicts a schematic diagram of the control system of FIG. 1 configured to control a manufacturing machine, such as a punch cutter, a cutter or a gun drill, of manufacturing system, such as part of a production line.

FIG. 7 depicts a schematic diagram of control system 502 configured to control system 700 (e.g., manufacturing machine), such as a punch cutter, a cutter or a gun drill, of manufacturing system 702, such as part of a production line. Control system 502 may be configured to control actuator 504, which is configured to control system 700 (e.g., manufacturing machine).

Sensor 506 of system 700 (e.g., manufacturing machine) may be an optical sensor configured to capture one or more properties of manufactured product 704. Classifier 514 may be configured to determine a state of manufactured product 704 from one or more of the captured properties. Actuator 504 may be configured to control system 700 (e.g., manufacturing machine) depending on the determined state of manufactured product 704 for a subsequent manufacturing step of manufactured product 704. The actuator 504 may be configured to control functions of system 700 (e.g., manufacturing machine) on subsequent manufactured product 106 of system 700 (e.g., manufacturing machine) depending on the determined state of manufactured product 704.

Figure 8:
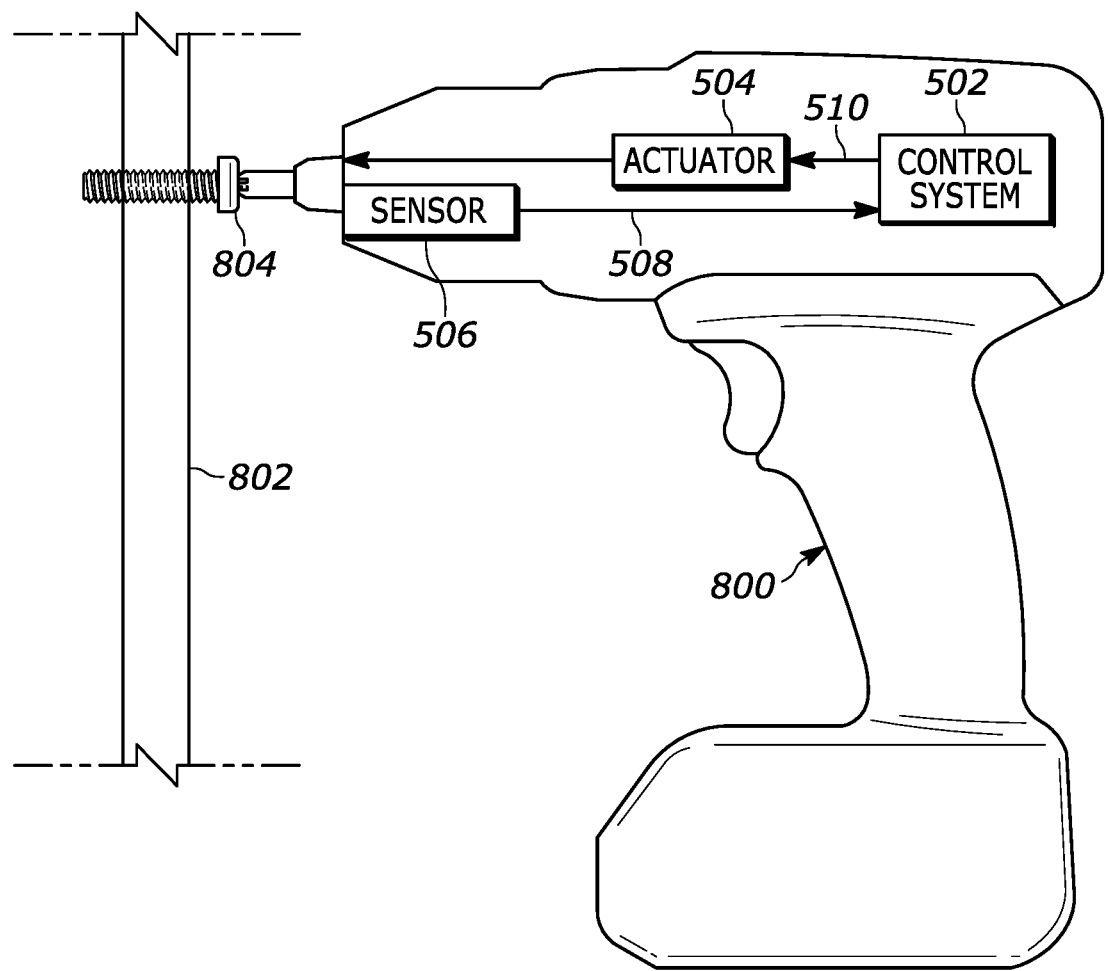
FIG. 8 depicts a schematic diagram of the control system of FIG. 1 configured to control a power tool, such as a power drill or driver, that has an at least partially autonomous mode.

FIG. 8 depicts a schematic diagram of control system 502 configured to control power tool 800, such as a power drill or driver, that has an at least partially autonomous mode. Control system 502 may be configured to control actuator 504, which is configured to control power tool 800.

Sensor 506 of power tool 800 may be an optical sensor configured to capture one or more properties of work surface 802 and/or fastener 804 being driven into work surface 802. Classifier 514 may be configured to determine a state of work surface 802 and/or fastener 804 relative to work surface 802 from one or more of the captured properties. The state may be fastener 804 being flush with work surface 802. The state may alternatively be hardness of work surface 802. Actuator 504 may be configured to control power tool 800 such that the driving function of power tool 800 is adjusted depending on the determined state of fastener 804 relative to work surface 802 or one or more captured properties of work surface 802. For example, actuator 504 may discontinue the driving function if the state of fastener 804 is flush relative to work surface 802. As another non-limiting example, actuator 504 may apply additional or less torque depending on the hardness of work surface 802.

Figure 9:
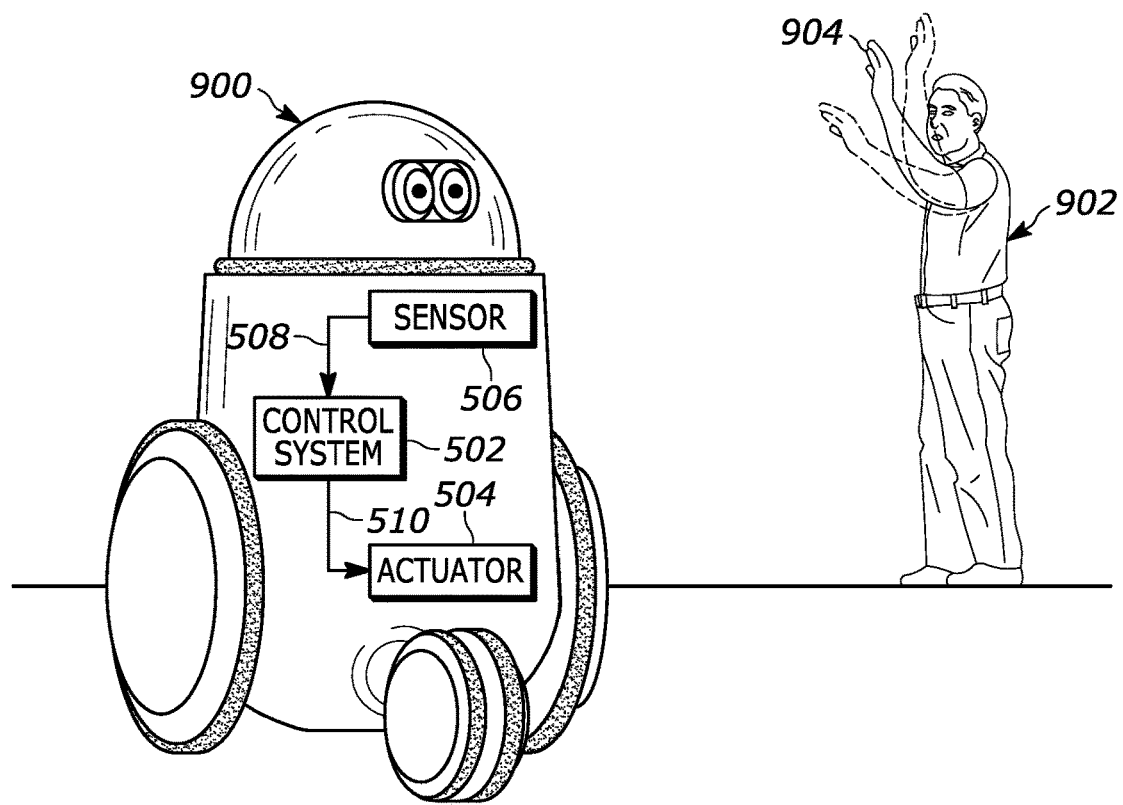
FIG. 9 depicts a schematic diagram of the control system of FIG. 1 configured to control an automated personal assistant.

FIG. 9 depicts a schematic diagram of control system 502 configured to control automated personal assistant 900. Control system 502 may be configured to control actuator 504, which is configured to control automated personal assistant 900. Automated personal assistant 900 may be configured to control a domestic appliance, such as a washing machine, a stove, an oven, a microwave or a dishwasher.

Sensor 506 may be an optical sensor and/or an audio sensor. The optical sensor may be configured to receive video images of gestures 904 of user 902. The audio sensor may be configured to receive a voice command of user 902.

Control system 502 of automated personal assistant 900 may be configured to determine actuator control commands 510 configured to control system 502. Control system 502 may be configured to determine actuator control commands 510 in accordance with sensor signals 508 of sensor 506.

Automated personal assistant 900 is configured to transmit sensor signals 508 to control system 502. Classifier 514 of control system 502 may be configured to execute a gesture recognition algorithm to identify gesture 904 made by user 902, to determine actuator control commands 510, and to transmit the actuator control commands 510 to actuator 504. Classifier 514 may be configured to retrieve information from non-volatile storage in response to gesture 904 and to output the retrieved information in a form suitable for reception by user 902.

Figure 10:
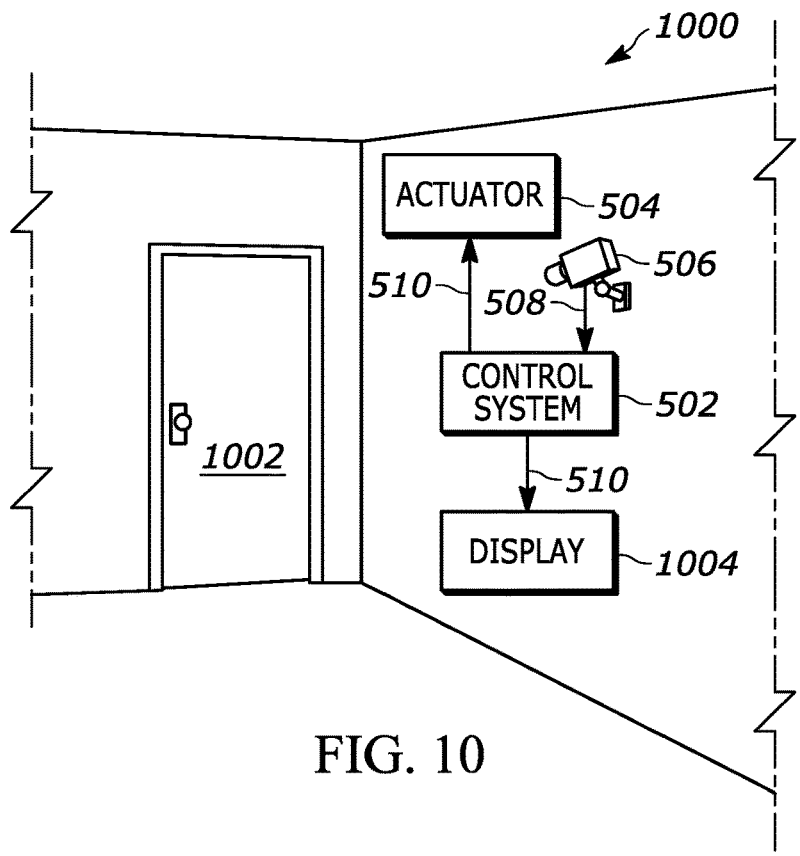
FIG. 10 depicts a schematic diagram of the control system of FIG. 1 configured to control a monitoring system, such as a control access system or a surveillance system.

FIG. 10 depicts a schematic diagram of control system 502 configured to control monitoring system 1000. Monitoring system 1000 may be configured to physically control access through door 1002. Sensor 506 may be configured to detect a scene that is relevant in deciding whether access is granted. Sensor 506 may be an optical sensor configured to generate and transmit image and/or video data. Such data may be used by control system 502 to detect a person's face.

Classifier 514 of control system 502 of monitoring system 1000 may be configured to interpret the image and/or video data by matching identities of known people stored in non-volatile storage 516, thereby determining an identity of a person. Classifier 514 may be configured to generate and an actuator control command 510 in response to the interpretation of the image and/or video data. Control system 502 is configured to transmit the actuator control command 510 to actuator 504. In this embodiment, actuator 504 may be configured to lock or unlock door 1002 in response to the actuator control command 510. In other embodiments, a non-physical, logical access control is also possible.

Monitoring system 1000 may also be a surveillance system. In such an embodiment, sensor 506 may be an optical sensor configured to detect a scene that is under surveillance and control system 502 is configured to control display 1004. Classifier 514 is configured to determine a classification of a scene, e.g. whether the scene detected by sensor 506 is suspicious. Control system 502 is configured to transmit an actuator control command 510 to display 1004 in response to the classification. Display 1004 may be configured to adjust the displayed content in response to the actuator control command 510. For instance, display 1004 may highlight an object that is deemed suspicious by classifier 514. Utilizing an embodiment of the system disclosed, the surveillance system may identify adversarial perturbations or random perturbations (e.g., bad shadows or lighting) in the video of the environment.

Figure 11:
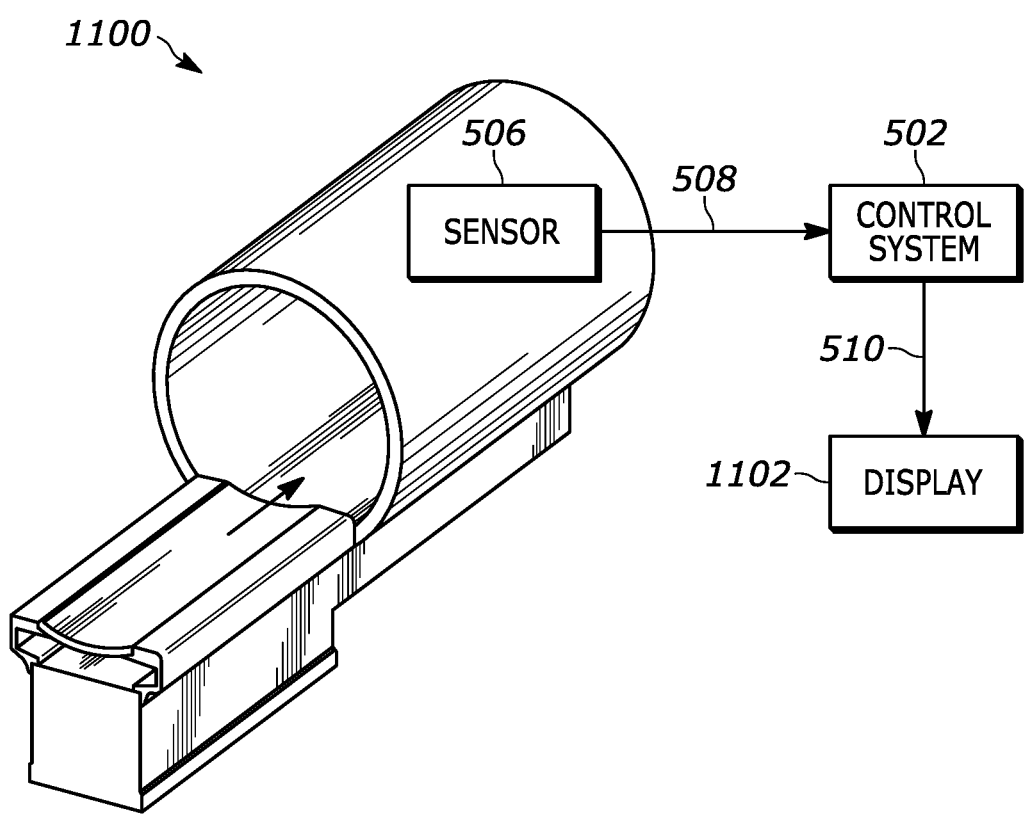
FIG. 11 depicts a schematic diagram of the control system of FIG. 1 configured to control an imaging system, for example an MM apparatus, x-ray imaging apparatus or ultrasonic apparatus.

FIG. 11 depicts a schematic diagram of control system 502 configured to control imaging system 1100, for example an Mill apparatus, x-ray imaging apparatus or ultrasonic apparatus. Sensor 506 may, for example, be an imaging sensor. Classifier 514 may be configured to determine a classification of all or part of the sensed image. Classifier 514 may be configured to determine or select an actuator control command 510 in response to the classification obtained by the trained neural network. For example, classifier 514 may interpret a region of a sensed image to be potentially anomalous. In this case, actuator control command 510 may be determined or selected to cause display 302 to display the imaging and highlighting the potentially anomalous region.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to or more characteristics, these embodiments are not outside the scope of the disclosure and can be desirable for particular applications.

What is claimed is:

1. A computer-implemented method for training a machine-learning network, comprising:
   receiving an input data from a sensor, wherein the input data is indicative of image, radar, sonar, or sound information;
   generating a perturbed input data set utilizing the input data, wherein the perturbed input data set includes perturbed data;
   denoising, via a pre-trained denoiser, the perturbed input data set to generate a denoised data set;
   training the machine-learning network utilizing the denoised data set, wherein the machine-learning network is configured to reject the denoised data set, utilizing a rejector, when a classification probability falls below a classification threshold, wherein the classification threshold is associated with classification the denoised data set, wherein the rejector is trained to discriminate between correctly classified inputs and misclassified denoised inputs; and
   in response to the classification probability falling below the classification threshold, outputting an abstain classification associated with the input data, wherein the abstain classification is ignored for classifying.

2. The computer-implemented method of claim 1, wherein the method includes outputting a final classification that has a majority vote in comparison to the abstain classification when classifying.

3. The computer-implemented method of claim 1, wherein the method includes utilizing a classifier that includes a per-class rejector that is a binary detector for original classes associated with the input data.

4. The computer-implemented method of claim 1, wherein the method includes utilizing a pre-trained classifier configured to classify the input data and a rejector configured to reject classification of the denoised data set.

5. The computer-implemented method of claim 1, wherein the method includes utilizing multiple iterations of the denoised data set.

6. The computer-implemented method of claim 1, wherein method further includes utilizing a classifier configured to classify the input data.

7. A system including a machine-learning network, comprising:
   an input interface configured to receive input data from a sensor, wherein the sensor includes a camera, a radar, a sonar, or a microphone;
   a processor, in communication with the input interface, wherein the processor is programmed to:

receive the input data, wherein the input data is indicative of image, radar, sonar, or sound information;
generate a perturbed input data set utilizing the input data, wherein the perturbed input data set includes perturbations of the input data;
denoise the perturbed input data set utilizing a denoiser, wherein the denoiser is configured to generate a denoised data set;
send the denoised data set to both a pre-trained classifier and a rejector, wherein the pre-trained classifier is configured to classify the denoised data set and the rejector is configured to reject a classification of the denoised data set, wherein the rejector is configured to be trained via discriminating correctly classified images and misclassified randomly perturbed images;
train, utilizing the denoised input data set, the a rejector to achieve a trained rejector; and
in response to obtaining the trained rejector, output an abstain classification associated with the input data, wherein the abstain classification is ignored for classifying.

8. The system of claim 7, wherein the denoiser is a pretrained denoiser.

9. The system of claim 7, wherein the processor is further programmed to output a final classification associated with the input data.

10. The system of claim 7, wherein training the rejector includes utilizing Monte Carlo sampling associated with the input data.

11. The system of claim 7, wherein the rejector includes a shared backbone configured to be parameterized.

12. The system of claim 7, wherein the denoiser is configured to remove or mitigate Gaussian noise added to the input.

13. A computer-program product storing instructions on a non-transitory storage media which, when executed by a computer, cause the computer to:
receive input data from a sensor, wherein the input data is indicative of image, radar, sonar, or sound information;
generate a perturbed input data set utilizing the input data, wherein the perturbed input data set includes perturbations of the input data;
denoise the input data set utilizing a pretrained denoiser, wherein the pretrained denoiser is configured to generate a denoised data set;
classify or reject the denoised data set utilizing a pretrained classifier and a rejector;
train the rejector utilizing the denoised data set, wherein the rejector is configured to reject the denoised data set when a classification probability falls below classification threshold, wherein the classification threshold is associated with classification of the denoised data set, wherein the rejector is trained to discriminate between correctly classified inputs and misclassified denoised inputs; and
in response to the classification probability falling below the classification threshold, output an abstain classification associated with the input data, wherein the abstain classification ignores a classification.

14. The computer-program product of claim 13, wherein the input data includes an image received from a camera in communication with the computer.

15. The computer-program product of claim 13, wherein instructions further cause the computer to train the rejector, wherein training includes an upper bound and lower bound defined utilizing Monte Carlo sampling.

16. The computer-program product of claim 13, wherein the instructions further cause the computer to classify or reject the denoised data set utilizing the pretrained classifier for multiple iterations.

17. The computer-program product of claim 13, wherein the pretrained denoiser is configured to be trained and mitigate Gaussian noise or remove Gaussian noise.

18. The computer-program product of claim 13, wherein parameters of the rejector are configured to learn via training the rejector to discriminate a correct classification versus a misclassification.

19. The computer-program product of claim 13, wherein the input data includes sound information obtained from a microphone.

* * * * *